(12) United States Patent
Whelan

(10) Patent No.: US 8,676,689 B1
(45) Date of Patent: Mar. 18, 2014

(54) FINANCIAL STATUS MEASUREMENT AND MANAGEMENT TOOL

(76) Inventor: Keith Whelan, Long Valley, NJ (US)

( * ) Notice: Subject to any disclaimer, the term of this patent is extended or adjusted under 35 U.S.C. 154(b) by 0 days.

(21) Appl. No.: 13/422,193

(22) Filed: Mar. 16, 2012

Related U.S. Application Data

(60) Provisional application No. 61/468,133, filed on Mar. 28, 2011.

(51) Int. Cl.
*G06Q 40/00* (2012.01)

(52) U.S. Cl.
USPC ............................................. 705/36 R

(58) Field of Classification Search
CPC ................................................. G06Q 40/00
USPC ........................... 705/35, 36 R, 38, 30, 39
See application file for complete search history.

(56) References Cited

U.S. PATENT DOCUMENTS

| | | | | |
|---|---|---|---|---|
| 5,358,278 | A * | 10/1994 | Ellis | 281/31 |
| 7,165,044 | B1 | 1/2007 | Chaffee | |
| 7,571,129 | B2 | 8/2009 | Ebert | |
| 7,610,233 | B1 | 10/2009 | Leong et al. | |
| 7,778,936 | B2 | 8/2010 | Adhikari | |
| 2002/0046143 | A1 | 4/2002 | Eder | |
| 2002/0091991 | A1 * | 7/2002 | Castro | 717/106 |
| 2002/0095363 | A1 | 7/2002 | Sloan et al. | |
| 2004/0068429 | A1 * | 4/2004 | MacDonald | 705/10 |
| 2004/0073467 | A1 | 4/2004 | Heyns et al. | |
| 2004/0162738 | A1 * | 8/2004 | Sanders et al. | 705/1 |
| 2004/0205008 | A1 | 10/2004 | Haynie et al. | |
| 2005/0055289 | A1 | 3/2005 | Mehldahl | |
| 2005/0102209 | A1 * | 5/2005 | Sagrillo et al. | 705/35 |
| 2005/0119922 | A1 | 6/2005 | Eder | |
| 2006/0112130 | A1 | 5/2006 | Lowson | |
| 2007/0055598 | A1 | 3/2007 | Arnott et al. | |
| 2008/0290599 | A1 * | 11/2008 | DeLaCruz-Newlan et al. | 273/256 |
| 2009/0106136 | A1 * | 4/2009 | Wright | 705/35 |
| 2009/0204531 | A1 | 8/2009 | Johnson | |

OTHER PUBLICATIONS

Fazzari et al. "Tax Policy and Investment; A Reconsideration. Investment, Financing Decisions, and Tax Policy" May 1989 NBER Working Paper R1193.*

Lamont, Owen "Cash Flow and Investment: Evidence From Internal Capital Markets" Mar. 1997, The Journal of Finance, vol. 52, Issue 1, Pates 83-109.*

* cited by examiner

*Primary Examiner* — Kelly Campen
(74) *Attorney, Agent, or Firm* — Goldstein Law Offices, P.C.

(57) ABSTRACT

A system, method and software tool to measure and manage financial status. The tool produces a spreadsheet that summarizes the position of an individual or small business user by integrating net worth data with cash flow data and tracking against financial goals. These data are retrieved by linking with popular financial, tax preparation and budgeting software and the user's financial data stored on secure websites. The tool provides government statistics matched to the user to present a comprehensive financial position, comparing the user's position with similar households. The method integrates analysis of assets and liabilities with cash flow and assists the user in setting goals to achieve financial independence. The system supplies the user with written material explaining concepts of integrating net worth and cash flow, the software tool and access to a social networking website for exchange of ideas relating to wealth and cash flow measurement and management.

20 Claims, 10 Drawing Sheets

FIG. 10B

YOUR NEXT GOAL:

SAVE [G1] BY [D2](DATE) (USER FILLS IN THEIR NEXT GOAL AMOUNT)

...TO [G2]  ( D3 MONTHS )

MONTHLY SAVINGS GOAL: [G4] / MO.

GOAL TRACKER

| | D4 | D5 | D6 | D7 | D8 | D9 | D10 | D11 | D12 | D13 | D14 | D15 |
|---|---|---|---|---|---|---|---|---|---|---|---|---|
| PLAN: | G5 | G6 | G7 | G8 | G9 | G10 | G11 | G12 | G13 | G14 | G15 | G16 |
| ACTUAL: | T1 | T2 | T3 | T4 | T5 | T6 | T7 | T8 | T9 | T10 | T11 | T12 |

| | D16 | D17 | D18 | D19 | D20 | D21 | | |
|---|---|---|---|---|---|---|---|---|
| | G17 | G18 | G19 | G20 | G21 | G22 | ACTUAL SAVINGS TO DATE: | |
| | T13 | T14 | T15 | T16 | T17 | T18 | T61 | |

30

HOW ACHIEVING YOUR NEXT GOAL WILL IMPACT YOUR FINANCIAL SITUATION:

| | NET WORTH | CASH FLOW BEFORE LIVING EXPENSES | STAGE OF FINANCIAL LIFE CYCLE |
|---|---|---|---|
| CURRENT SITUATION: | I1 | I2 | DEBT REDUCTION ( %DEBTS/ASSETS = I3 ) |
| AFTER ACHIEVING THE GOAL: | I4 | I5 | DEBT REDUCTION ( %DEBTS/ASSETS = I6 ) |

40

FINANCIAL STATUS MEASUREMENT AND MANAGEMENT TOOL

CROSS-REFERENCE TO RELATED APPLICATIONS

This application claims the benefit of U.S. Provisional Application No. 61/468,133, filed on Mar. 28, 2011, which is herein incorporated by reference in its entirety for all purposes.

TECHNICAL FIELD

Generally, the present disclosure relates to a financial status measurement and management tool. More particularly, the present disclosure relates to a web-based software application tool in a system, employing a method of self-directed financial planning, that summarizes financial position by integrating net worth data of assets and liabilities with cash flow data, and providing goal-setting tools and demographically relevant comparative data.

BACKGROUND

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

Economic downturns accompanied by foreclosures and bankruptcy filings sober up consumers and increase their desire to manage their financial assets in a more knowledgeable and competent manner. Most Americans save too little, spend too much, carry too high a debt burden and have no plan on how to turn their financial lives around. Unfortunately, these individuals and small business owners have little or no grasp of financial basics and feel that they cannot develop and follow a financial plan alone.

Generally, many people believe financial planning and management is a budgeting problem and many have provided budgeting tools for reaching short-term goals, focusing on cash flow. Others believe that financial planning is an investment strategy and provide tools for portfolio management with a focus on net worth. In my own copyrighted booklet, "Wealth is good, cash flow is better: simple rules and a single tool to measure and manage your financial success," (® Keith Whelan, 2007) I have explained that neither approach is sufficient for financial success. The booklet explains how every asset is analyzed not just with respect to the associated liability, such as a mortgaged property, but also the impact of the asset and associated liability on cash flow.

Many have proposed systems for gathering and collating relevant financial data to calculate or manage financial position. Most of these are narrowly tailored to meet the needs of managers of large businesses who manage the internal assets of a company. Those that focus on the individual or small business financial health generally focus on gathering data or portfolio management.

Sloan et al. (U.S. Patent Application Publication 2002/0095363) teaches future cash flow analysis using automated and live coaching, the amount and depth of coaching based on a service level agreement. In this system, the user manually enters financial data and the system models only cash flow for the user. The only external data included in the cash flow calculation are generic data such as interest and inflation rates, allowing the user to model different outcomes and providing an associated risk assessment.

Haynie et al. (U.S. Patent Application Publication 2004/0205008) discloses a system and a method for computing cash flows of taxpayers from verified tax and financial data, taking data from scanned verified tax transcripts or from a database containing verified tax data. The system is intended to provide financial planning assistance, but for third party users, such as lending institutions, or allows the user to merely calculate cash flow.

Johnson (U.S. Patent Application Publication 2009/0204531) teaches financial management and referral software into which a user manually enters assets, liabilities and goals and associates goals with particular assets or liabilities to create a budget, a separate cash flow statement, a separate balance sheet and a separate income statement, without integrating the statements, budget or balance sheet together. The user updates the program with financial transactions and the software reconciles the transactions with the various financial statements and budget. A trigger event associates a professional service provider, providing a referral to the user to the professional provider based on a need identified by the triggering event.

Chaffee (U.S. Pat. No. 7,165,044) discloses an investment tracking system, using an internet query, to create a performance report by gathering security price data for all user's holdings, connecting to various databases and pulling customer account information into one report to yield a report on the net worth of assets, profits and loss, and return on investment. The system collates data from multiple accounts into one report. The system uses a single entry method to produce a double entry presentation. There is no cash flow analysis and the focus is narrowly limited to only publicly traded securities, without considering other assets.

Arnott et al. (U.S. Patent Application Publication 2007/0055598) teaches a method for creating a system of indices based on accounting based data, as well as various financial and non-financial metrics to use as a basis to purchase securities for a portfolio. While this provides guidance for an investor, it is limited to investing and does not provide an overview of net worth that includes other assets and liabilities, nor does it analyze the cash flow from the investments.

Heyns et al. (U.S. Patent Application Publication 2004/0073467) provides planning and budgeting modeling for business managers to increase cash flow and increase shareholder value, which in turn, increases market value of the stock. The model identifies key drivers of value to create operating strategies, increase critical capabilities, align process and communicate strategy and execution. However, it does not provide tools for the individual, nor consider capitalization, in the case of the corporation, or net worth, in the case of the individual.

Ebert (U.S. Pat. No. 7,571,129) describes a method of visualizing numerical business benchmarks to present general performance relative to the industry; the benchmarks include calculating all financial ratios such as quick ratio, current ratio, return on assets, and return on equity. The method is for an investor or others to evaluate a business prior to acquiring or investing. The method is limited to investment analysis and does not provide direct cash flow analysis of the business nor demonstrate the effect of the investment on net worth or on cash flow of the investor.

Eder (U.S. Patent Application Publication 2002/0046143) describes a system for valuing high technology companies by measuring performance of business elements, such as human resources and sales management, and predicting future cash flows based on each element. The method pulls data from internal and external databases to calculate the relationship between the market value of the business and the calculated business value for use in forecasting future equity prices. Eder has further refined the system in (U.S. Patent Application Publication 2005/0119922) to perform the valuation on a specific date. Induction algorithms are used to create composite variables that relate element performance to enterprise revenue, expenses and changes in capital. Predictive models are then used to determine the correlation between the value drivers and the enterprise revenue, expenses and changes in capital. These methods provide no insight to an individual, but only to executive level management of a publicly traded company and not to the small business.

Lowson (U.S. Patent Application Publication 2006/0112130) discloses a system that standardizes, automates, and facilitates the process of identifying, evaluating, selecting, and managing product and service resources for both individual and business resource users within specific industries. This system does not analyze cash flow or net worth and does not relate product and service resources to financial measurements.

Mehldahl (U.S. Patent Application Publication 2005/0055289) describes a multi-dimensional business information accounting application to generate conventional accounting statements or to slice the data to produce business specific information. This method provides no insight to an individual, but only to executive level management of a business. It merely prepares conventional statements or customized statements, with no financial analysis.

Adhikari (U.S. Pat. No. 7,778,936) provides valuations of a business entity, enabling a user to modify the input elements to determine how the modified elements affect the financial output of the valuation, and a module enabling the user to switch between modes.

Leong et al. (U.S. Pat. No. 7,610,233) developed a network system for bidding in a virtual financial trade environment that promotes categorizing bids and sending to sellers, who then made offers to the buyers. Transactions are then closed between the parties. The system provides no financial or analytical tools for measuring and managing financial status for an individual or small business.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

The present disclosure addresses at least one of the foregoing disadvantages. However, it is contemplated that the present disclosure may prove useful in addressing other disadvantages in a number of technical areas. Therefore, the claims should not necessarily be construed as limited to addressing any of the particular disadvantages discussed herein.

It is an object of an example embodiment of the present disclosure to produce a method, a system and a software tool to measure and manage financial status that takes advantage of a user's electronically locally stored financial data. Accordingly, an example embodiment is a method, a system and a software tool that accesses financial data files stored on a personal computing device associated with a plurality of popular software applications such as tax preparation software and budgeting software and reads those data files into the software tool.

It is another object of another example embodiment of the present disclosure to produce a method, a system and a software tool to measure and manage financial status that takes advantage of a user's financial account data files stored in a plurality of financial websites. Accordingly, an example embodiment is a method, a system and a software tool that accesses financial data files stored on websites associated with a plurality of financial accounts such as brokerage accounts, draft accounts and deposit accounts and reads those data files into the software tool.

It is yet another object of yet another example embodiment of the present disclosure to produce a method, a system and a software tool to measure and manage financial status that accounts for variable living expenses along with fixed expenses associated with liabilities in a net worth calculation. Accordingly, an example embodiment is a method, a system and a software tool that accesses budgetary data files stored locally on a personal computing device from a plurality of popular budgeting or expense software and resulting in a monthly variable living expense liability to produce a more vigorous calculation of net worth and cash flow.

It is a further object of further example embodiment of the present disclosure to produce a method, a system and a software tool to measure and manage financial status that prepares and presents an integrated view of a user's financial position. Accordingly, an example embodiment is a method, a system and a software tool that integrates a user's assets and liabilities composing the user's net worth and associates each asset and liability with a cash flow and further defining and demonstrating the relationship between individual balance sheet and cash flow items.

It is yet a further object of a yet further example embodiment of the present disclosure to produce a method, a system and a software tool to measure and manage financial status that evaluates and classifies assets not just in net worth, but also in cash flow impact. Accordingly, an example embodiment is a method, a system and a software tool that uniquely classifies and ranks every asset into categories based on appreciation, depreciation and cash flow attributes and prioritizes the assets and the associated liabilities for debt elimination or further acquisition.

It is still another object of a still another example embodiment of the present disclosure to produce a method, a system and a software tool to measure and manage financial status that includes goal setting to achieve financial independence. Accordingly, an example embodiment is a method, a system and a software tool that ranks the liabilities to aid in deciding how to eliminate debt and increase cash flow as a user works toward a plurality of sequential goals appropriate to each financial life cycle stage, ultimately working toward financial independence. For each sequential goal, the embodiment establishes a monthly savings amount and a timetable for monitoring actual versus planned savings amounts until the goal is achieved.

It is still a further object of a still further example embodiment of the present disclosure to produce a method, a system and a software tool to measure and manage financial status that allows a user to compare one's financial position to others. Accordingly, an example embodiment is a method, a system and a software tool that provides to a user, comparative data from a segment of the United States population that matches the user in age, homeownership and income as well as comparing how a plurality of system users in aggregate compare to United States average households, promoting a common community goal for system users and creating a sense of purpose and engagement for the user.

It is an additional object of an additional example embodiment of the present disclosure to produce a method, a system and a software tool to measure and manage financial status that provides a user a social network venue supporting financial decisions. Accordingly, an example embodiment is a method, a system and a software tool that creates a central electronic gathering place or hub, where a community of users with a common focus and goal accesses and shares ideas and links with external resources with other users and monitors aggregated community data against an average United States household, creating a community team with a financial score and a common goal.

Another example embodiment of the present disclosure is a method, a system and a software tool to measure and manage financial status. The tool produces a spreadsheet that summarizes the position of an individual or small business user by integrating net worth data of assets and liabilities with cash flow data and tracking against a user's financial goals. These data are first retrieved from government statistics matched to the user's age, income and homeownership status, and they are used to initially populate a net worth and cash flow spreadsheet. The user then revises this initial spreadsheet with their own asset, liability and cash flow data either manually or by linking with popular tax preparation and budgeting or other software and the user's financial data stored on secure websites. The method integrates an analysis of assets and liabilities in relationship to cash flow to assist the user in setting goals to achieve financial independence. The system supplies the user with written material explaining the concepts of integrating the analysis of net worth and cash flow, the software tool and access to a social networking website for exchange of ideas relating to wealth measurement and management.

To the accomplishment of the above and related objects the present disclosure may be embodied in the form illustrated in the accompanying drawings. Attention is called to the fact, however, that the drawings are illustrative only. Variations are contemplated as being part of the present disclosure.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
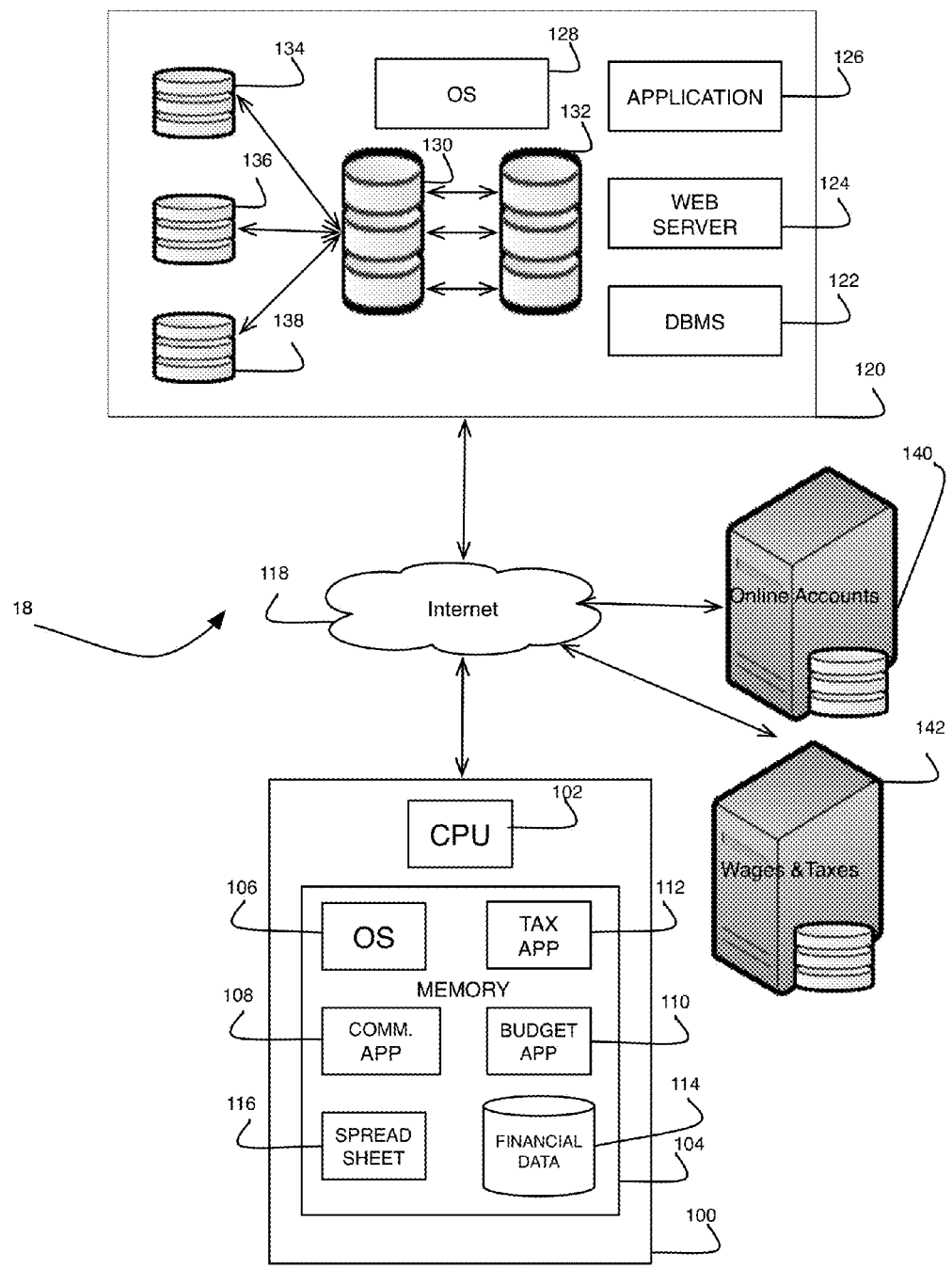
FIG. 1 is a block diagram of an example embodiment of a system to measure and manage financial status according to the present disclosure.

An example embodiment is a system, a method and a software tool to measure and manage financial status. The tool produces a spreadsheet that summarizes the position of an individual or small business user by integrating net worth data with cash flow data and tracking against financial goals. The data is retrieved by linking with popular financial, tax preparation and budgeting software and the user's financial data stored on secure websites. The tool provides government statistics matched to the user to present a comprehensive financial position, comparing the user's position with similar households. The method integrates an analysis of assets and liabilities with cash flow and assists the user in setting goals to achieve financial independence. The system supplies the user with written material explaining the concepts of integrating net worth and cash flow, the software tool and access to a social networking website for exchange of ideas relating to wealth measurement and management.

An example embodiment of the present disclosure is a method of personal financial planning. The method includes providing a worksheet having a matrix of cells configured to store personal financial data. Said worksheet includes a balance sheet section configured to calculate a net worth value of each asset and liability listed in said worksheet and a total net worth value of all assets and all liabilities listed in said worksheet and a cash flow statement section configured to store a cash flow value of said each asset and liability and calculate a total cash flow value of said all assets and liabilities. The method includes receiving worksheet data for populating at least a portion of said worksheet according to contents of said worksheet data. Said worksheet data includes an asset value of said each asset, a liability value of said each asset, said cash flow value of said each asset and liability, a living expense value and a salary value. The method includes determining and displaying a first cash flow value from said total cash flow value after considering said living expense value for a time period, a second cash flow value from said first cash flow value after considering said salary value for said time period, a percentage ratio value of a total liability value to a total asset value and a stage in a financial lifecycle. Said stage is associated with said ratio value and said second cash flow value.

The method can include prior to said receiving worksheet data, populating via a computer network said worksheet with modeled financial data corresponding to a segment of domestic household population. Said modeled financial data includes a segment asset value, a segment liabilities value and a segment cash flow value. The method can include receiving financial goal data corresponding to a financial goal to be achieved by a specific date, said goal associated with said stage. The method can include displaying a goal progress element configured to track achievement of said goal, said goal progress element includes a comparison tool for comparing to date said goal to actual savings data associated with actual savings. The method can include saving said worksheet for subsequent access in a worksheet database, said worksheet configured for subsequent update upon subsequent access, said database stores a plurality of worksheets including said worksheet. Said financial lifecycle includes a debt accumulation stage, an asset accumulation stage, a debt reduction stage, a wealth accumulation stage, a partial financial independence stage and a complete financial independence stage. Said living expense value is a sum of component living expense items and said salary value includes a value corresponding to at least one of said salary items. Said receiving worksheet data contains said modeled financial data modifiable by a user of said worksheet.

The method can include providing a visual interface for selecting said segment from a plurality of segments of domestic household population. The method can include receiving input via said interface corresponding to said segment. Said segment includes a government statistic and said receiving worksheet data includes importing financial data from at least one of a financial software application and a financial database accessible via a computer network. Said goal includes at least one of an asset goal, a liability goal and a savings goal. Said goal progress element, said stage, said balance statement section and said cash flow statement section are concurrently displayed in said worksheet.

The method can include receiving financial goal update data, updating and storing said financial goal data in said worksheet with said financial goal update data, providing access to a model worksheet. Said model worksheet is pre-populated with model data corresponding to a model segment of domestic household population. The method can include providing secure access to said worksheet and providing access to a digital publication explaining significance of integrating net worth and cash flow.

The method can include providing a feedback forum for providing feedback associated with said worksheet providing access to a social networking element configured for exchange of ideas relating to wealth measurement and management. Importing financial data includes automatic importing.

The method can include receiving a fee from a financial provider for a listing in a directory of financial providers. Said directory classified by types of at least one of financial product and financial services said providers provide. Said directory includes contact information of said financial providers. In response, inserting contact information of said provider into said directory, providing access to said directory; and integrating said directory with said feedback forum and said social networking element.

The method can include simulating said providing a worksheet, said receiving worksheet data and said determining and displaying for a financial education program having a life simulation function where a student learns how a financial decision and an outcome of said decision is reflected in said worksheet.

FIG. 1 illustrates an example system 18 for implementing a method of measuring and managing a user's financial status. The system 18 provides a method and a tool so that the user can manage a plurality of assets, liabilities and expenses in a manner that increases cash flow leading to financial independence. The user participates as a member in the system 18 by using the system 18 to measure and manage financial status through the method, as presented and explained in an e-booklet for members. The user uses a software application tool that measures and calculates according to the method. Also, the user can use the software application tool for interacting with other members through the social network provided in the system.

The method is a self-directed financial planning method that fills an unmet need of the user by providing a plurality of simple rules for managing the big impact assets, liabilities and expenses affecting a user's financial position, by providing a single tool for measuring a user's overall successful financial progress, by providing a social network platform to attract and engage a community of users on a large scale, empowering them with the use of the method's software tool, rules and resources to effectively manage their overall financial position.

The method of measuring and managing financial status begins with the user quantitatively measuring the user's financial status by employing the system 18 through an internet connection 118 from a personal computing device 100 to a website hosted on at least one server 124 in a data processing system 120. The data processing system 120 has a plurality of hardware with at least one server 124 and at least one storage device 120. The user accesses the data processing system 120 through the Internet 118. A plurality of databases hosted on web servers 140, 142 extract and upload the user's financial account data to compute the user's financial status by a financial measurement and management software application 126 and display in a worksheet or a spreadsheet. The worksheet or spreadsheet can include a plurality of sub-worksheets or sub-spreadsheets. The user can further access an e-booklet, which is stored in a static database, a database three 134, explaining the method of measuring and managing assets, liabilities and expenses to increase cash flow. The system 18 with the implemented method of financial measurement and management—the e-booklet, the worksheet, the website, the social network and the software application 126—is a unique, complete, ongoing self-directed financial planning system.

The method computes the user's financial status by first, computing a net worth and a cash flow. The net worth and the cash flow are two important financial measures, the cash flow being the more important than the net worth. The user enters data manually onto the device 100 or the data processing system 120 uploads the data from a database 140 containing the user's financial data 114 associated with a plurality of applications residing in memory 104 on the personal computing device 100, such as a tax preparation application 112, a budgeting application 110, and a spreadsheet application 116. The personal computing device 100 has a central processing unit (CPU) 102, an operating system 106, and a communication application 108 that allows data to transfer over the Internet 118. The personal computing device 100 has other necessary software such as, for example, but not limited to, an email client and device drivers that are well known to those of ordinary skill and are beyond the scope of this discussion. The personal computing device 100 can be, for example, but is not limited to, a desktop computer, a laptop computer, a smart phone, a tablet computer, or a personal digital assistant.

The data processing system 120 has a plurality of software, such as an operating system 128, a database management system module 122, and a web server module 124. The data processing system 120 has other necessary software, such as, for example, but not limited to, drivers, an email server, and engines that are well known to those of ordinary skill.

The data processing system 120 uploads the financial data from a plurality of online databases containing the user's financial accounts 140, such as, for example, but not limited to, a deposit account, a brokerage account, a draft account, a lien or mortgage, or a credit card account. The system 120 uploads financial data associated with a plurality of online databases containing the user's tax and wage accounts 142, such as, for example, but not limited to, property tax ledgers, property assessment ledgers, or income tax filings. If the user stores budgeting and other financial data in other online databases, the system 120 uploads the associated financial data. The data processing system 120 accesses a dynamic database, database five 138, the database containing a plurality of external market data, such as real estate market values, vehicle book values, loan amortization and payment calculators, and other external asset, liability and expense data. The system 120 uploads the data directly from the databases listed herein by the user linking the processing system 120 to the databases directly, providing necessary security information, such as, for example, but not limited to, an account identification number, a password, a security code or the user uploads the data, storing the data on the personal computing device 100, the processing system 120 or the user uploading the data from the personal computing device 100.

Figure 10A:
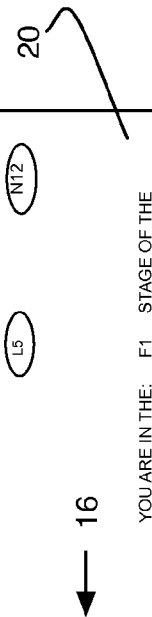
FIG. 10 is an example embodiment of a graphical display of the software tool worksheet integrating a plurality of assets and liabilities with a plurality of cash flows and tracking a plurality of savings against the financial goal according to the present disclosure.

After the processing system 120 has uploaded the data, the processing system 120 stores the data in a dynamic database, database one 130, processing the data to compute the cash flow and the net worth. The method of financial measurement integrates these two measures into a single unique worksheet, thereby creating a single financial document to measure and manage the user's overall financial situation and defining and demonstrating the relationship between individual balance sheet and cash flow items. The integration of these two measures is accomplished by the software tool, a financial measurement and management software application 126 that computes the cash flow and net worth and creates and displays the worksheet 16, an example of which is illustrated in FIG. 10.

Still referring to FIG. 1, the data processing system 120 downloads the worksheet to the user's personal computing device 100. For each asset, the software application 126 calculates the net worth of the asset by subtracting the liability associated with the asset and further calculates the cash flow, either positive or negative generated by the asset. This analysis allows the user to clearly see how to classify and prioritize each asset into a ranking of best, second best and worst based appreciation, depreciation and cash flow attributes. Assets that both appreciate and generate cash flow are ranked best, assets that either appreciate or generate cash flow are ranked second best, and assets that neither appreciate nor generate cash flow are ranked worst.

The system 18 further refines cash flow calculation by precisely defining and calculating living expenses as a single number from account data associated with budgeting software and integrates the single number into the financial planning system to accurately calculate the monthly cash flow of the user. The application 126 extracts all financial data from variable living expenses, to tally the expenses and enters the calculated living expense result as well as a user's net salary amount, subtracting the expense result and adding the net salary amount to produce the actual monthly cash flow.

Figure 8:
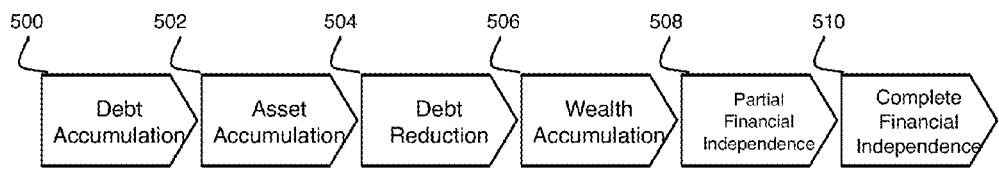
FIG. 8 is an example embodiment of a graphical display in the software tool for illustrating a user's financial life cycle stage according to the present disclosure.

The method further calculates the user's financial status as a stage in a Financial Life Cycle. The method defines each stage of the Financial Life Cycle using both net worth and cash flow measures and establishes precise measurable definitions for each stage. FIG. 8 shows graphically the six stages in a Financial Life Cycle.

The first stage is debt accumulation 500, where the user's net worth is negative, that is, the user's total liabilities are greater than the value of the user's assets. The second stage is asset accumulation 502. The asset accumulation stage is defined when a user's net worth is positive, but the user's percentage ratio of liabilities to assets is greater than fifty percent and monthly cash flow before living expenses is negative. The debt reduction stage 504 is defined when a user's percentage ratio of liabilities to assets fall and stays below fifty percent, staying above ten percent, but monthly cash flow before living expenses is still negative. The fourth stage is the wealth accumulation stage 506, defined as when a user's percentage ratio of liabilities to assets fall and stays below ten percent, but monthly cash flow before living expenses is still negative. The fifth stage is partial financial independence 508, defined as when cash flow from sources is positive, covering all monthly expenses, except variable living expenses. The final stage and ultimate goal of the financial measurement and management system is complete financial independence 510. Complete financial independence 510 is defined as when cash flow from sources other than salary covers all monthly expenses, including variable living expenses, regardless of net worth measures.

Referring to FIG. 1, the software application 126 calculates the percentage liability (or debt) to asset ratio, the cash flow after variable living expenses, and the cash flow after net salary. The application 126 compares these numbers to the various parameters defining the stages and determines the stage the user is in, defining the current financial status of the user. In FIG. 8, a chevron illustrates each stage graphically. The current financial status is graphically displayed on the worksheet by shading the chevrons in FIG. 8 to indicate the stages that are completed as well as indicating the progress within the current stage. Referring to FIG. 1, the data processing system 120 downloads the graphical display on the worksheet to the user's personal computing device 100.

The method includes a goal-tracking step to complete the financial planning process and make it an ongoing process. The software application 126 allows the user to selectively pick either paying off the next logical debt or acquiring a next logical asset, basing the decision on a plurality of ranking rules of the method presented in the e-booklet and as described herein. The software application 126 displays in the worksheet a pair of drop down menu boxes, a first menu box to select whether to pay off a liability (debt) or acquire an asset and a second menu box listing each liability and asset in the worksheet. The user makes selections and sets a savings goal based on the displayed monthly cash flow after salary. The software application 126 displays in the worksheet a plurality of elements, the elements calculated by the software application 126, such as the total saving goal to pay off the debt or acquire the asset, the monthly savings amount and number of months needed to achieve the goal as well as a calendar for updating actual savings amounts versus plan as well as cumulative total amount saved. The software application 126 tracks the impact of paying off a liability or acquiring an asset and displays the impact on cash flow on the worksheet. The user updates the financial data by uploading the data as described hereinabove at least monthly.

Goal setting and tracking completes the financial planning cycle and makes it an ongoing process, starting with measurement of financial status, goal setting to guide management of financial decisions, re-measurement of financial status, setting a new goal and repeating the cycle as described hereinabove. The method of financial planning becomes simple and manageable, with a focus on just one goal at a time and creates system stickiness, stickiness defined as an attribute of a system that encourages users to return regularly to the system in order to update their progress.

The system 18 provides a data comparison step for the user to supplement the user's financial planning. As shown in FIG. 1, the data processing system provides a static database, database four 136, the database storing sample worksheets pre-populated with benchmarking data for a plurality of United States household segments. The segments are categorized by demographic data profile, such as, for example, but not limited to, age, homeownership and income. The database 136 provides a regularly updated comparison of aggregate total users' data to overall United States average household data, encouraging users to focus on a common community goal of member users to surpass the U.S. average and creating a sense of purpose and engagement. Throughout the present disclosure, a user can be an individual, a household of multiple individuals or a small business and the user selects a sample worksheet matching the user's demographic data profile.

After uploading updated data to the software application 126, the system 18 updates the user's worksheet with calculations for net worth, cash flow, percentage asset to debt ratio, determines position in the financial life cycle, tracks progress against savings goal, displays impact of savings on cash flow, the data is archived in a static database, database two 132. Either before or after updating data, but before leaving the system, the user selectively participates in the social network platform. The user can have the opportunity to comment or rate a plurality of features of the software application, the method and the system. Also, the social network platform, can include a feedback forum, which allows the user to interact with other users and exchange information and ideas about any of many, such as twenty one, categorized net worth, cash flow or other financial topics. Furthermore, the social platform can include a blog for publishing articles on wealth and cash flow and the user and other users can comment on the articles. During entry of a comment or a rating, the comment or rating is stored in dynamic database one 130. Dynamic database one 130 also stores a plurality of computational formulae and rules of the method and the software application 126. Once the user leaves the system 18, the comment or rating is archived in static database two 132.

FIG. 10 shows an example of the worksheet 16 of the software application 126 embodying the method. The worksheet 16 has a plurality of portions, an upper portion 20, a middle goal tracker portion 30, a bottom life cycle portion 40 and a graphic display for goal tracking, shown in FIG. 8.

Referring to FIG. 10, values that are populated manually or by uploading from the databases generally appear in boxes in the upper section of the worksheet 16. Values that are calculated by the software application generally appear in a plurality of ovals.

The upper portion 20 is populated manually by the user entering data or in the manner described hereinabove with the assets as indicated by a plurality of boxes labeled A1 through A9, liabilities, commonly referred to as debts, as indicated by a plurality of boxes labeled L1 through L4, and the cash flow of the assets, either positive or negative, associated with the assets or liabilities, as indicated by a plurality of boxes labeled C1 through C11. The net worth of the assets is calculated by subtracting the liability associated with each asset from the value of the asset; the net worth of the assets is displayed in the ovals labeled N1 through N11. It is understood by those of ordinary skills that this is a non-limiting graphic representation of the worksheet 16 and that the worksheet 16 can contain as many boxes and ovals as required for the various financial data. A box, in this example, labeled V1 is populated manually or from other databases, represents the monthly single combined living expenses of the user.

The living expenses are aggregated into a single entry, showing that these expenses are the lower eighty percent of financial transactions, but have an impact on twenty percent of the user's financial position. The worksheet 16 graphically directs the user to focus on the twenty percent of financial transactions that have an impact on eighty percent of a user's financial position, a rule of the method generally referred to as the "80/20 Rule." Another box, in this example, labeled C14 is populated manually or from other databases, represents the monthly income from non-asset sources such as, for example, but not limited to, wages, tips, commissions, and salary of the user. The software application automatically populates the worksheet 16 with the current date, D1. The software application calculates the values of the total assets, displayed in the oval labeled A10, the total liabilities, displayed in the oval labeled L5, the total net worth, displayed in the oval labeled N12, the total fixed cash flow, displayed in the oval labeled C12, the monthly cash flow after living expenses, displayed in the oval labeled C13, the monthly cash flow after salary, displayed in the oval labeled C15, and the percentage ratio of liabilities to assets, displayed in the oval labeled F2. The software application calculates the stage of financial life cycle from the percentage debt to asset ratio, the cash flow after variable living expenses and the cash flow after net salary and numerically displays the stage in F1 and graphically displays the result in the appropriate chevron in FIG. 8.

Still discussing FIG. 10, the middle portion 30 of the worksheet 16 has the goal tracker. The user enters an amount to save in the box labeled G1. The pair of drop down menu boxes, a first menu box to select whether to pay off a liability (debt), or acquire an asset labeled G2, with a first arrow indicating the drop down menu and a second menu box listing each liability and asset in the worksheet 16 labeled G3, with a second arrow indicating the drop down menu. A box labeled G4 is initially pre-populated with the calculated value displayed in C15, which can be selectively manually overwritten by the user. A box labeled G5, equal to the value in the box labeled G4 is the user's monthly planned savings amount to achieve the goal in the box labeled G1. G5=G4. The boxes labeled G5 through G22 are populated with the same amount. It is understood by those of ordinary skills that this is a non-limiting representation of an example worksheet 16 and that the worksheet contains as many boxes as required for a savings plan, the actual number determined by the quotient of the total savings goal displayed G1 to the monthly savings goal displayed in G4 with an extra box for a quotient remainder.

Each box labeled G5 or higher has a month associated with it, D4 being the next full month after the saving target is set, each subsequent month labeled incrementally with as many months as required, the actual number determined by the quotient of the total savings goal displayed in the box labeled G1 to the monthly savings goal displayed in the box labeled G4, with an extra month for any remainder, the total number of months displayed in a cell labeled D3 and the target month the goal is attained displayed in a cell labeled D2, calculated by adding the total number of months to the current month.

The user enters the amount actually saved towards the goal in the boxes labeled T1 through T18, in this example display, the software application automatically calculating the cumulative amount and displaying the total in the box marked T61.

The bottom portion 40 of the worksheet 16 displays the measures of the user's current financial situation. A box labeled I1 is populated by the result for net worth displayed in oval N12, a box labeled I2 is populated by the result for monthly cash flow before living expenses displayed in oval C12 and a box labeled I3 is populated by the result for percentage debt to asset ratio displayed in oval F2. The boxes labeled I4, and I6 represent these same measures, net worth, cash flow before variable expense and debt/asset ratio in the future respectively, if the user achieves the targeted goal, calculating the change by adding or subtracting the cash flow associated with the liability that has been eliminated or the asset that has been acquired. These calculations of the future financial status encourage the user to keep to the financial plan.

In an example embodiment, the system includes functionality for other financial software to download data from the worksheet 16 to use in other financial software, such as, for example, but not limited to, tax preparation and budgeting software.

Those of ordinary skill in the art will understand that the illustrative displays such as FIG. 8 and FIG. 10 are to be interpreted in an example manner and that displays different from those shown and described herein can be used within the scope of the present disclosure. For example, features of the displays can be combined, separated, interchanged, and/or rearranged to generate other displays.

Figure 3:
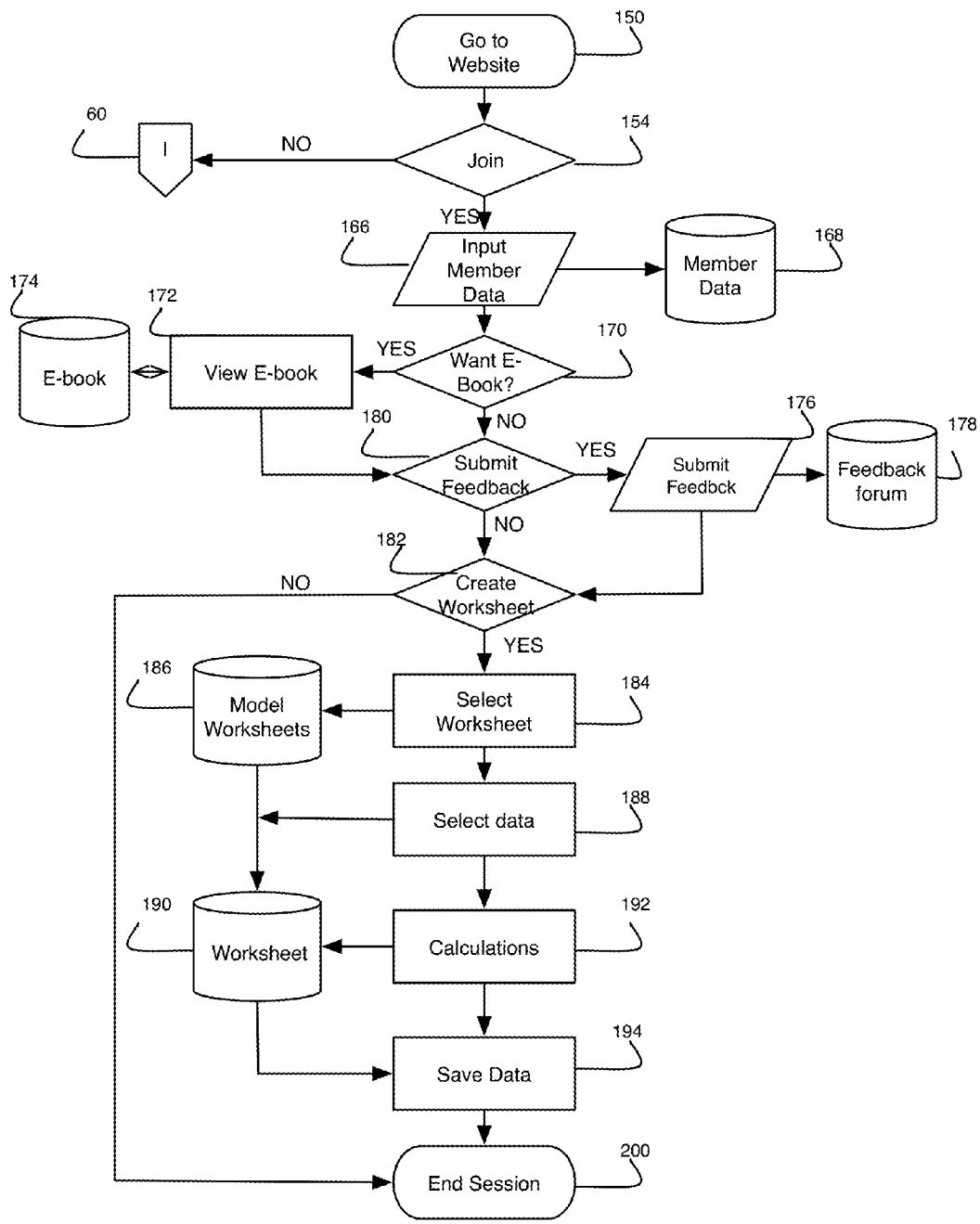
FIG. 3 is a flow diagram of an example embodiment of a process of creating an account, viewing an electronic booklet, submitting feedback and creating a worksheet according to the present disclosure.
Figure 9:
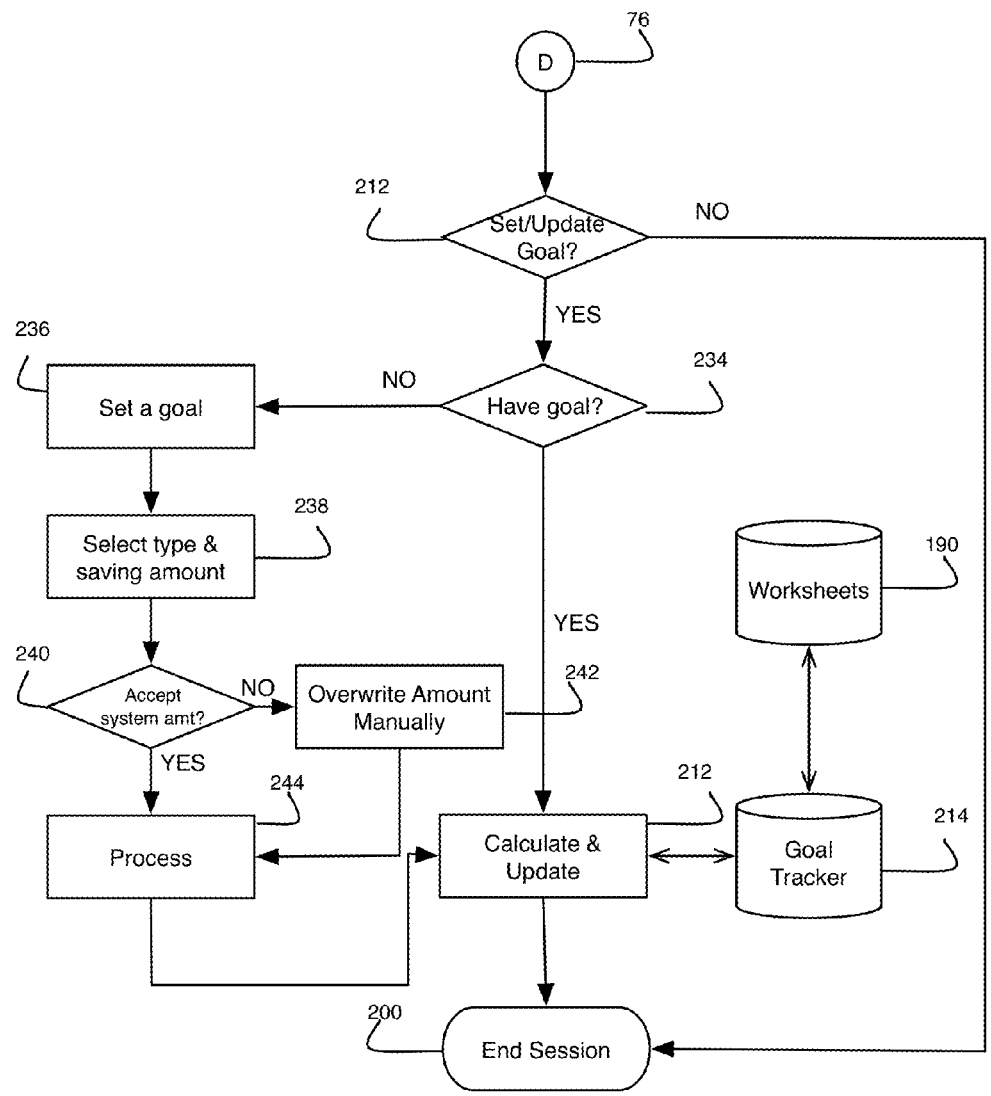
FIG. 9 is a flow diagram of an example embodiment of a sub-process for setting a goal and updating progress against the goal in the system according to the present disclosure.

FIG. 3 shows the process that a new user follows when using the system. The user visits the website 150. The website queries if the user wishes to join 154. If the answer is no, the system directs the user to another process as indicated by a connector labeled II 60. If the user decides to join, the user inputs personal identifying data 166 that is stored in database one 168 and subsequently archived in database two. After joining by inputting the necessary data, the system queries whether the user desires to view the e-booklet 170 explaining a method of the present disclosure. If the user decides to view the e-booklet 172, the user accesses the static database three 174 storing the e-booklet. The system queries whether the user desires to submit feedback and participate in the social network platform 180. If the user desires to participate, the user submits the comment or rating 176, which is stored in dynamic database one 178 and archived in static database two. The system queries whether the user desires to create a personal worksheet 182. If the user desires to create the worksheet 182, the user selects a model worksheet pre-populated with benchmarking data for a plurality of United States household segments from the static database four 186 that matches the user's demographic data profile, such as, for example, but not limited to, age, homeownership and income. For example, the benchmarking data can refer to modeled and mapped domestic household financial profile data, such as latest Federal Reserve Survey of Consumer Finances and latest Bureau of Labor Statistics Consumer Expenditure Survey. The user uploads the required data manually or automatically retrieves from the databases 188 as described hereinabove and creates a worksheet file in the software application in memory in the dynamic database one 190. A sub-process for setting a goal is shown in FIG. 9. Referring back to FIG. 3, the software application calculates the measures of financial status 192 as described hereinabove, populating the worksheet with the calculated values. The data is saved 194 and archived when the user is finished and the session is ended 200. The flow chart shows in a linear sequential fashion the decisions to view the e-booklet 170, submit feedback in the social network platform 180 or to create a worksheet 182. It is understood by those of ordinary skill in the art that the order of these decisions is immaterial and iterative and the user can selectively decide to execute the decisions in the process in a different order.

Figure 2:
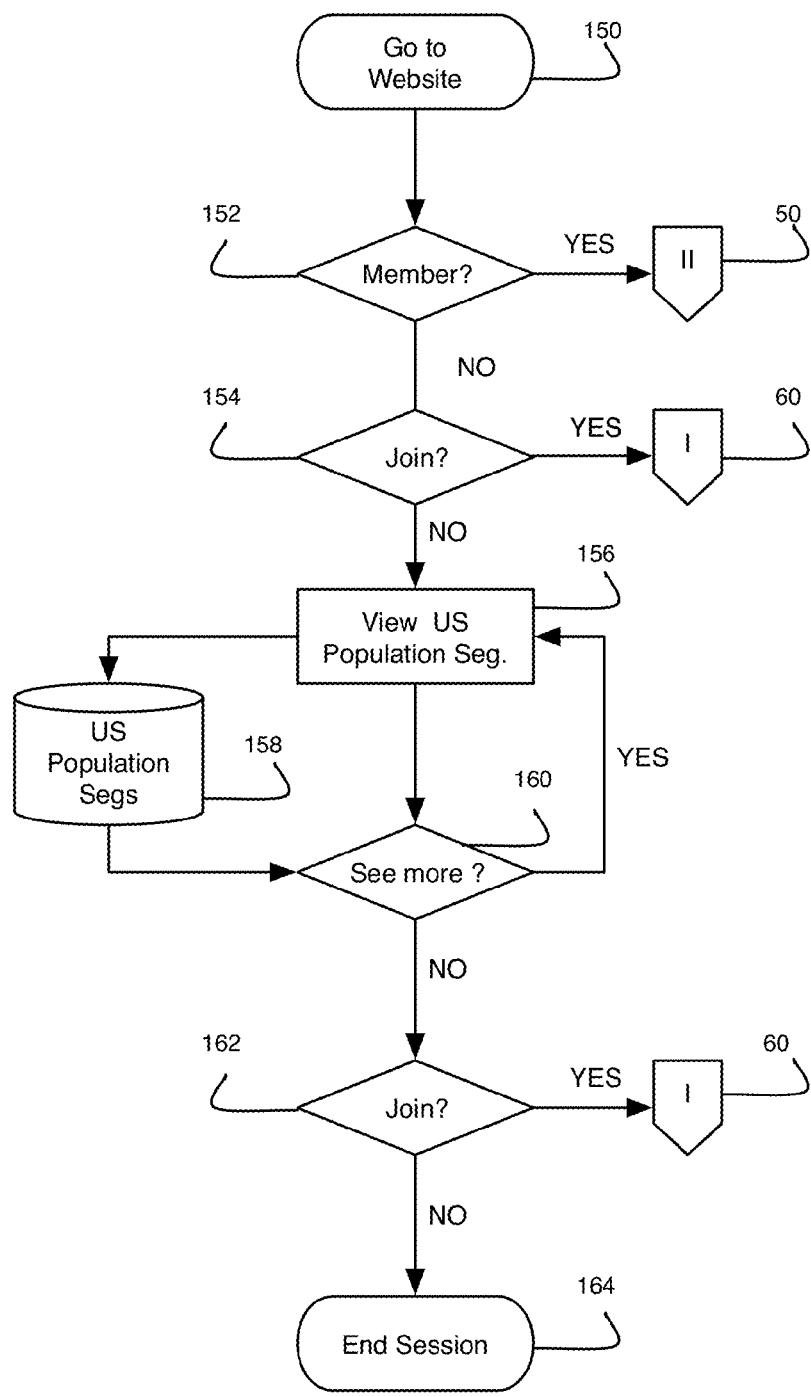
FIG. 2 is a flow diagram of an example embodiment of a process of viewing comparative financial data in the system to measure and manage financial status according to the present disclosure.

FIG. 2 demonstrates an initial visit to the website of the system 150. The system queries to determine if the user is a member 152. If the user is a member, the system directs the user to another process as indicated by a connector labeled II 50. If the user is not a member, the system queries the user to determine if the user desires to join 154. If the user desires to join, the system directs the user to another process as indicated by a connector labeled I 60. If the user is not a member and does not desire to join, the system permits the user to browse financial data associated with a U.S. population segment 156. The system retrieves the data from static database four 158. The system further queries if the user wishes to see an additional population segment data 160. If the answer is yes, the loop of retrieving and querying repeats until, the user does not desire to see more data. The system again queries the user whether the user desires to join 162. If the user desires to join, having seen the comparative population segment data, the system directs the user to another process as indicated by a connector labeled I 60. If the user does not desire to join at this time, the session ends 164.

Figure 4:
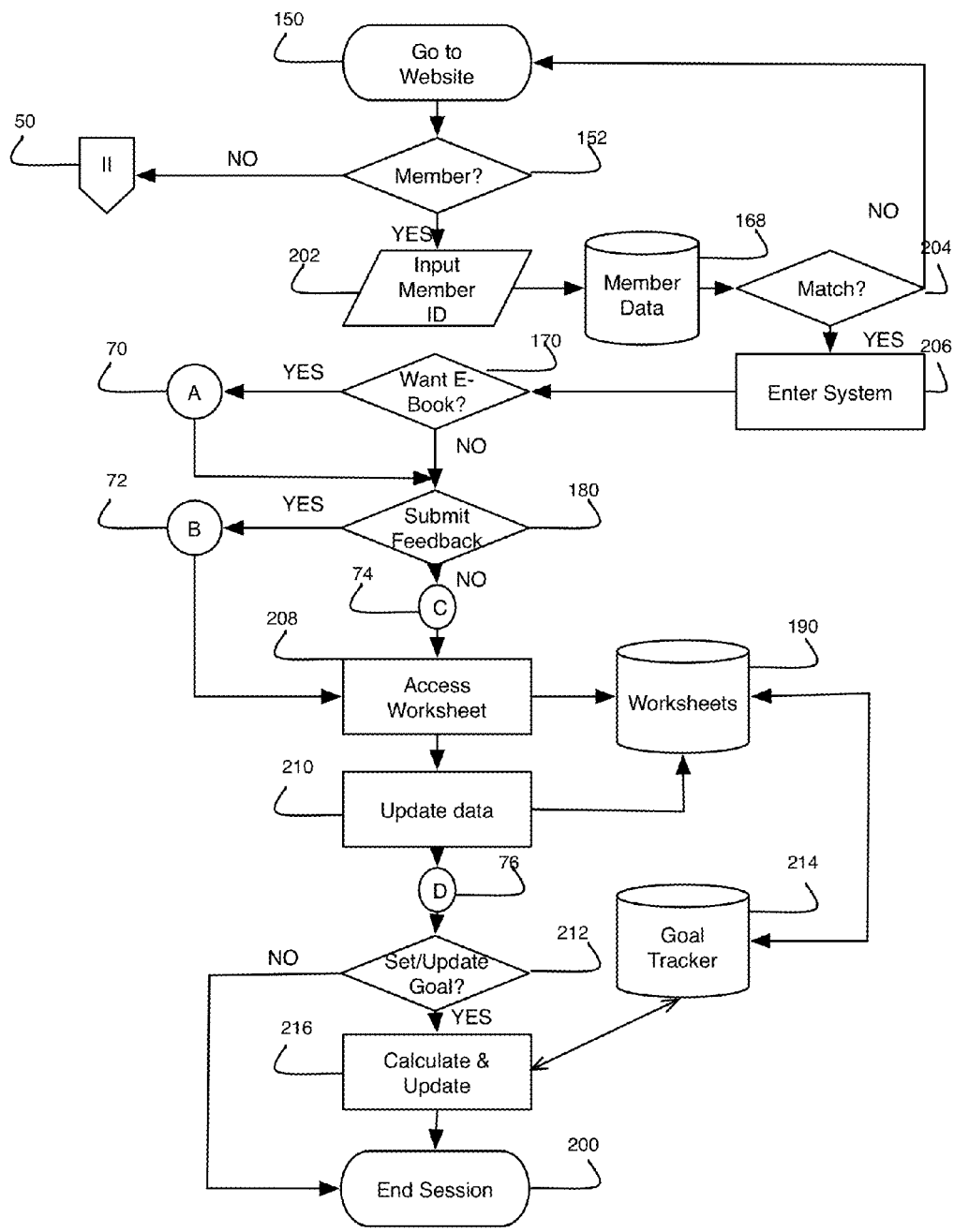
FIG. 4 is a flow diagram of an example embodiment of a process for interfacing with a plurality of functions in the system according to the present disclosure.
Figure 5:
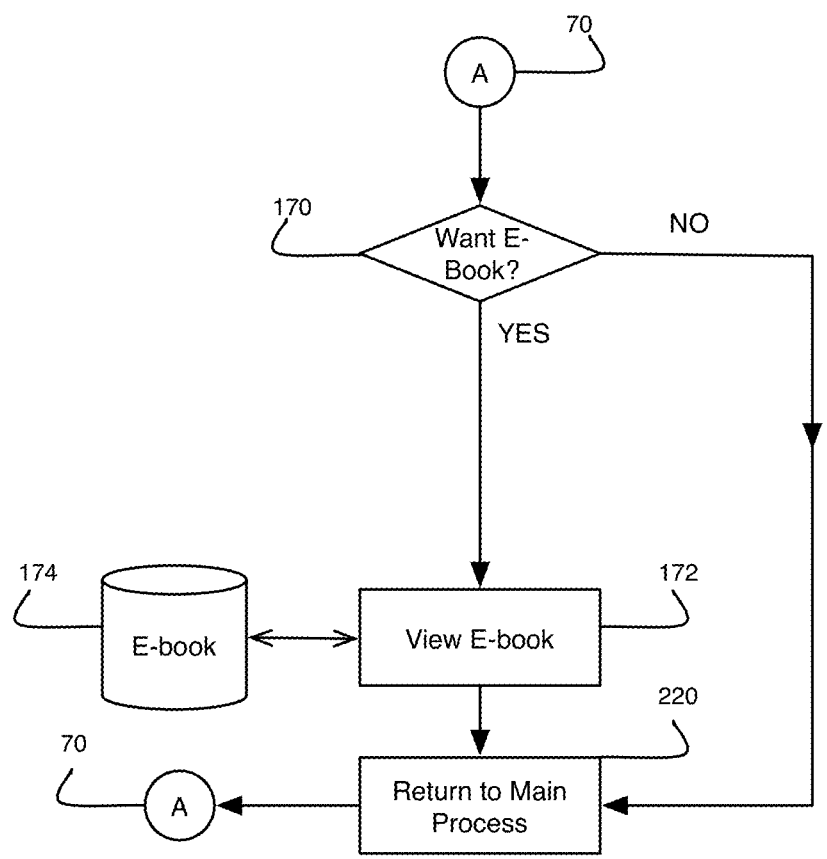
FIG. 5 is a flow diagram of an example embodiment of a sub-process for interfacing with an electronic booklet function in the system according to the present disclosure.

FIG. 4 illustrates a main process the user follows after joining when visiting the website 150. The system queries if the user is a member 152. If the answer is negative, the system directs the user to the process for joining or browsing population segments, indicated by the connector labeled II 50. If the user is a member, the user inputs identifying data 202, such as, for example, but not limited to, user name, password or security code. The system determines if the input matches a file 204 in the dynamic database one 168. If there is not a match, the system directs the user to the initial screen. If there is a match, the user enters the system 206. The system queries the user to determine if the user desires to view the e-booklet 170. If the answer is yes, the system follows a sub-process, as indicated by a connector labeled A 70 and as illustrated in FIG. 5. If the answer is no, the user remains in the main process.

FIG. 5 shows the steps in the sub-process for viewing the e-booklet 170. If the user does not desire to view the e-booklet, the system returns the user to the main process 220. When the viewing is complete, the user returns to the main process 220. It should be obvious to those of ordinary skill that this process is replicated when there are a plurality of e-booklets and e-booklet versions available in the system, so that a user is permitted to view each available booklet and booklet version.

Figure 6:
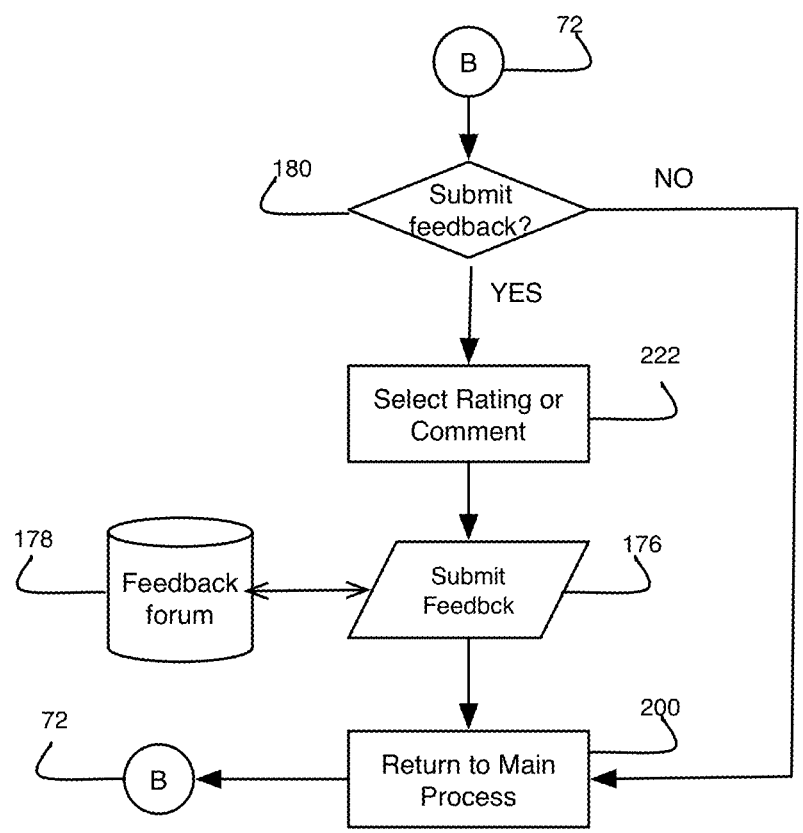
FIG. 6 is a flow diagram of an example embodiment of a sub-process for interfacing with a social network function in the system according to the present disclosure.

Returning to discussing FIG. 4, the system queries the user to determine if the user desires to submit feedback in the social network platform 180. If the answer is yes, the system follows a sub-process, as indicated by a connector labeled B 72 and as illustrated in FIG. 6. If the answer is no, the user remains in the main process.

FIG. 6 shows the steps in the sub-process for submitting feedback 180. The user selectively chooses a rating through a graphic user interface (GUI) 222 such as, for example, but not limited to, stars, dollar signs, or numbers, the higher the number or quantity of stars or dollar signs, the higher the rating. The user selectively enters a comment and submits the feedback 176. The comment or rating is held in dynamic database one 178 and archived in static database two. The user returns to the main process 200. Also, as discussed above, the feedback can include a feedback forum for idea exchange about various financial topics and a blog for article publication and commenting.

Returning again to FIG. 4, the user accesses the user's worksheet 208 and updates or reviews the worksheet in the main process. The review and update of the worksheet is a sub-process as indicated by a connector labeled C 74 and as illustrated in more detail in FIG. 7.

Figure 7:
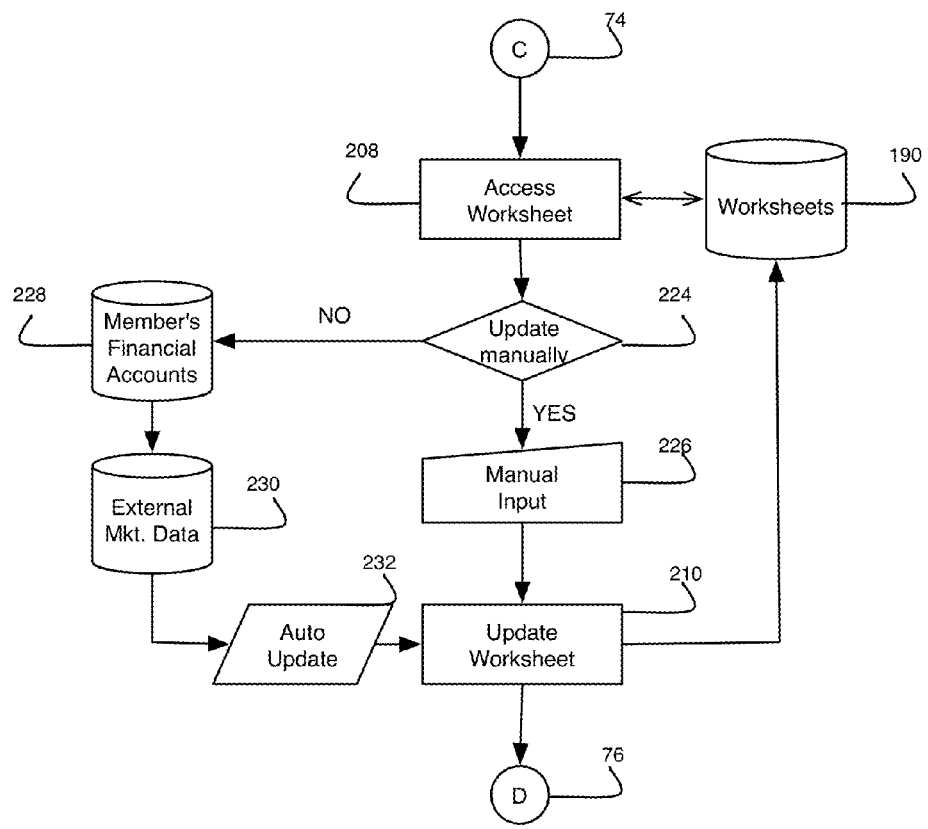
FIG. 7 is a flow diagram of an example embodiment of a sub-process for accessing a software tool and updating financial data in the system according to the present disclosure.

FIG. 7 shows the user accessing the user's worksheet 208 from the archive in static database two 190 into dynamic database one for updating. The user chooses to update data manually or automatically 224. If the user chooses manual entry, the user enters updated data 226. If the user chooses to automatically upload, the system retrieves the updated data from online accounts and databases on the user's personal computing device 228. The system retrieves data 230 from dynamic database five with external market data as described hereinabove. The system automatically updates the worksheet with the data 232. The sub-process is iterative, so that the user enters some data manually 226 and then loops back to enter some data automatically 232 or in the alternate, starts with the data entered automatically 232 and add or overwrites some data manually 226. The user returns to the main process as illustrated in FIG. 4.

Returning again to FIG. 4, the user decides whether to revise and update or set a new goal 212 and to calculate the progress towards the goal 216. The revision and goal setting of the worksheet is a sub-process as indicated by a connector labeled D 76 and as illustrated in more detail in FIG. 9. If the user does not desire to update or set a new goal, the user leaves the system 200.

FIG. 9 shows the user using the sub-process of revising and updating the goal or setting the new goal. The system queries the user to determine if the user desires to set a new goal to acquire a different asset or pay down a different liability 212. If the answer is no, the user updates the progress towards the goal by entering the amount saved into the goal tracker portion of the worksheet 212. The system automatically calculates and updates the financial life cycle stage and related results 212. The goal tracker portion of the worksheet is stored in dynamic database one 214. The full worksheet is also stored in dynamic database one 190.

If the user has a new goal 236, the user enters the targeted savings amount, selects the whether to pay off a liability or acquire an asset and further selects the specific liability or asset of the goal 238. The system enters the monthly cash flow after salary as a savings target. The user accepts the amount 240 or overwrites the amount 242. The system creates a savings plan for each month as described in the discussion of the worksheet goal portion hereinabove 244. The system calculates and updates the worksheet with the resulting values 212 as described in the discussion of the worksheet goal portion hereinabove. The values are stored in worksheet goal tracker portion in dynamic database one 214.

In an example embodiment of the system, the user retrieves the worksheet of the matching segment and compares the user's worksheet to the matching segment. The user further retrieves the worksheet of a plurality of different segments for comparison purposes. The user retrieves the worksheet of the aggregated community of system users and compares the progress of the community with the financial status of the general U.S. population.

Returning again to FIG. 4, the user ends the session by logging out 200. The system stores the worksheet and the feedback in dynamic database one and archives a copy in static database two. In an example embodiment of the system, the user receives a monthly email alert with a link to the system, reminding the user to update the user's worksheet. In a further embodiment, the user receives a text message or SMS (short message service) monthly to alert the user to update the user's worksheet.

The flow chart in FIG. 4 shows in a linear sequential fashion the decisions to view the e-booklet, submit feedback in the social network platform or to update a worksheet with a new or revised goal. It is understood by those of ordinary skill in the art that the order of these decisions is immaterial and iterative and the user can selectively decide to execute the decisions in the process in a different order.

In addition to or in the alternative of viewing the e-booklet, the system can be configured such that the e-booklet can be viewed an unlimited number of times by members.

The system includes a goal-tracking function, which enables and displays how much ahead or behind the user is in actual savings to date with respect to the selected goal.

In an example embodiment, the system includes a financial provider directory or database, such as a yellow pages listing of financial product and service providers. Providers are classified by the type(s) of products/services they provide and a free basic listing would include address and contact info. For example, the system can include enhanced listings that providers would pay for and the listing would include more information, such as contact information, website access, videos. Also, members of the system could provide comments and ratings of the providers they use. Further, the system can include an extension of the feedback feature described above, where the feedback can include a feedback forum for idea exchange about various financial topics and a blog for article publication and commenting.

In an example embodiment, the system is tailored to a financial education/literacy programs, for example as taught in high school and college classes. For example, the system includes a life simulation program, similar to a Monopoly board game where students would use the system, make financial decisions, and the outcomes of their decisions would be reflected in their worksheets.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

In conclusion, herein are presented a method, a system and a software tool to measure and manage financial status. The self-directed method of financial planning creates a financial plan based on measuring and managing financial status by means of a system employing a software application tool through an internet connection from a personal computing device to a website in a data processing system. The present disclosure is illustrated by example in the drawing figures, and throughout the written description. It should be understood that numerous variations are possible, while adhering to the concepts of the present disclosure. Such variations are contemplated as being a part of the present disclosure.

What is claimed is:

1. A method of personal financial planning, said method comprising:
   providing, via a computer, a worksheet having a matrix of cells configured to store personal financial data, said worksheet includes a balance sheet section and a cash flow statement section;

populating, via said computer, said balance sheet section with a plurality of asset class values, a plurality of liability class values and a plurality of net worth class values;

populating, via said computer, said cash flow statement section with a plurality of periodic cash flow class values, a total periodic living expenses value and a total periodic income value, said periodic cash flow class values and said net worth class values corresponding to said asset class values and said liability class values;

determining, via said computer, a total asset value based on said asset class values, a total periodic cash flow value based on said periodic cash flow class values, a total liability value based on said liability class values and a total net worth value based on said net worth class values;

calculating, via said computer, a first periodic cash flow value based on a difference between said total periodic cash flow value and said total periodic living expenses value;

calculating, via said computer, a second periodic cash flow value based on a difference between said first periodic cash flow value and said total periodic income value;

determining, via said computer, a financial life cycle stage based on said total periodic cash flow value, said first cash flow value and a debt to asset ratio based on said total liability value and said total asset value; and displaying, via said computer, said populated asset class values, said populated periodic cash flow class values, said populated liability class values, said populated net worth class values, said populated total periodic living expenses value, said populated total periodic income value, said determined total asset value, said determined total periodic cash flow value, said determined total liability value, said determined total net worth value, said calculated first cash flow value, said calculated second cash flow value and said stage within said worksheet concurrently, wherein said populated asset class values, said populated liability class values, said populated total periodic living expenses value, said populated total periodic income value, said calculated first cash flow value and said calculated second cash flow value are labeled during said displaying.

2. The method of claim 1, further comprising:
receiving financial data based at least in part on a user selected demographic household segment, said populating based at least in part on said receiving, said financial data including at least one of said asset class values, said liability class values, said net worth class values and said periodic cash flow class values;

receiving a user modification of said received financial data as populated within said worksheet; and adjusting said financial life cycle stage based at least in part on said user modification.

3. The method of claim 1, further comprising:
displaying a plurality of planned financial goal visual elements associated with a plurality of time periods and a plurality of actual financial performance visual elements associated with said time periods within said worksheet concurrently, said planned financial goal visual elements associated with said actual financial performance visual elements, at least one of said planned financial goal elements containing at least one of a plurality of financial goal values initially populated according to said second periodic cash flow value, said actual financial performance elements containing a plurality of user actual financial performance values, an achievement of said financial life cycle stage based at least in part on at least one of said actual performing values meeting at least one of said financial goal values during at least one of said time periods; and saving said worksheet in a database configured to provide an instance of subsequent user access after a user worksheet modification.

4. The method of claim 1, further comprising:
graphically depicting said financial life cycle stage, said depicting based on a movement through at least one of a debt accumulation stage, an asset accumulation stage, a debt reduction stage, a wealth accumulation stage, a partial financial independence stage and a complete financial independence stage.

5. The method of claim 1, further comprising:
populating said worksheet with financial data from at least one of a financial software application and a financial database accessible via a communication network, said financial data including at least one of said asset class values, said liability class values, said net worth values and said period cash flow values.

6. The method of claim 1, further comprising:
providing access to an electronic publication explaining a significance of integrating a net worth and a cash flow according to said worksheet;

providing a feedback forum to receive feedback associated with said worksheet; and providing access to a social networking service configured for exchange of ideas relating to at least one of a wealth measurement and a wealth management according to said worksheet.

7. The method of claim 6, further comprising:
providing a directory of a plurality of financial providers, said directory classified by types of at least one of a financial product and a financial service provided via said providers, said directory including contact information of said financial providers;

receiving a fee from a financial provider for a listing in said directory;

inserting contact information of said provider into said directory based at least in part on receipt of said fee;

providing user access to said directory; and granting access to at least one of said feedback forum and said social networking service via said directory.

8. The method of claim 1, further comprising:
simulating said populating, said determining, said calculating and said displaying to a financial education program having a life simulation function where a student user learns how a financial decision and an outcome of said decision is reflected in said worksheet.

9. A non-transitory computer-readable storage medium including a plurality of computer readable instructions which, when executed via a computer processor, instruct said processor to facilitate performance of a method of personal financial planning, said method comprising:
providing, via said processor, a worksheet having a matrix of cells configured to store personal financial data, said worksheet includes a balance sheet section and a cash flow statement section;

populating, via said processor, said balance sheet section with a plurality of asset class values, a plurality of liability class values and a plurality of net worth class values;

populating, via said processor, said cash flow statement section with a plurality of periodic cash flow class values, a total periodic living expenses value and a total periodic income value, said periodic cash flow class values and said net worth class values corresponding to said asset class values and said liability class values;

determining, via said processor, a total asset value based on said asset class values, a total periodic cash flow value based on said periodic cash flow class values, a total liability value based on said liability class values and a total net worth value based on said net worth class values;

calculating, via said processor, a first periodic cash flow value based on a difference between said total periodic cash flow value and said total periodic living expenses value;

calculating, via said processor, a second periodic cash flow value based on a difference between said first periodic cash flow value and said total periodic income value;

determining, via said processor, a financial life cycle stage based on said total periodic cash flow value, said first cash flow value and a debt to asset ratio based on said total liability value and said total asset value; and displaying, via said processor, said populated asset class values, said populated periodic cash flow class values, said populated liability class values, said populated net worth class values, said populated total periodic living expenses value, said populated total periodic income value, said determined total asset value, said determined total periodic cash flow value, said determined total liability value, said determined total net worth value, said calculated first cash flow value, said calculated second cash flow value and said stage within said worksheet concurrently, wherein said populated asset class values, said populated liability class values, said populated total periodic living expenses value, said populated total periodic income value, said calculated first cash flow value and said calculated second cash flow value are labeled during said displaying.

10. The non-transitory computer-readable storage medium of claim 9, wherein said method further comprising:

receiving financial data based at least in part on a user selected demographic household segment, said populating based at least in part on said receiving, said financial data including at least one of said asset class values, said liability class values, said net worth class values and said periodic cash flow class values;

receiving a user modification of said received financial data as populated within said worksheet; and adjusting said financial life cycle stage based at least in part on said user modification.

11. The non-transitory computer-readable storage medium of claim 9, wherein said method further comprising:

displaying a plurality of planned financial goal visual elements associated with a plurality of time periods and a plurality of actual financial performance visual elements associated with said time periods within said worksheet concurrently, said planned financial goal visual elements associated with said actual financial performance visual elements, at least one of said planned financial goal elements containing at least one of a plurality of financial goal values initially populated according to said second periodic cash flow value, said actual financial performance elements containing a plurality of user actual financial performance values, an achievement of said financial life cycle stage based at least in part on at least one of said actual performing values meeting at least one of said financial goal values during at least one of said time periods; and saving said worksheet in a database configured to provide an instance of subsequent user access after a user worksheet modification.

12. The non-transitory computer-readable storage medium of claim 9, wherein said method further comprising:

graphically depicting said financial life cycle stage, said depicting based on a movement through at least one of a debt accumulation stage, an asset accumulation stage, a debt reduction stage, a wealth accumulation stage, a partial financial independence stage and a complete financial independence stage.

13. The non-transitory computer-readable storage medium of claim 9, wherein said method further comprising:

populating said worksheet with financial data from at least one of a financial software application and a financial database accessible via a communication network, said financial data including at least one of said asset class values, said liability class values, said net worth values and said period cash flow values.

14. The non-transitory computer-readable storage medium of claim 9, wherein said method further comprising:

providing access to an electronic publication explaining a significance of integrating a net worth and a cash flow according to said worksheet;

providing a feedback forum to receive feedback associated with said worksheet; and providing access to a social networking service configured for exchange of ideas relating to at least one of a wealth measurement and a wealth management according to said worksheet.

15. The non-transitory computer-readable storage medium of claim 14, wherein said method further comprising:

providing a directory of a plurality of financial providers, said directory classified by types of at least one of a financial product and a financial service provided via said providers, said directory including contact information of said financial providers;

receiving a fee from a financial provider for a listing in said directory;

inserting contact information of said provider into said directory based at least in part on receipt of said fee;

providing user access to said directory; and granting access to at least one of said feedback forum and said social networking service via said directory.

16. The non-transitory computer-readable storage medium of claim 9, wherein said method further comprising:

simulating said populating, said determining, said calculating and said displaying to a financial education program having a life simulation function where a student user learns how a financial decision and an outcome of said decision is reflected in said worksheet.

17. A system comprising:

a processor; and an application configured to execute via said processor, said application facilitating an implementation of a method of personal financial planning, said method comprising:

providing, via said processor, a worksheet having a matrix of cells configured to store personal financial data, said worksheet includes a balance sheet section and a cash flow statement section;

populating, via said processor, said balance sheet section with a plurality of asset class values, a plurality of liability class values and a plurality of net worth class values;

populating, via said processor, said cash flow statement section with a plurality of periodic cash flow class values, a total periodic living expenses value and a total periodic income value, said periodic cash flow class values and said net worth class values corresponding to said asset class values and said liability class values;

determining, via said processor, a total asset value based on said asset class values, a total periodic cash flow value based on said periodic cash flow class values, a total liability value based on said liability class values and a total net worth value based on said net worth class values;

calculating, via said processor, a first periodic cash flow value based on a difference between said total periodic cash flow value and said total periodic living expenses value;

calculating, via said processor, a second periodic cash flow value based on a difference between said first periodic cash flow value and said total periodic income value;

determining, via said processor, a financial life cycle stage based on said total periodic cash flow value, said first cash flow value and a debt to asset ratio based on said total liability value and said total asset value; and displaying, via said processor, said populated asset class values, said populated periodic cash flow class values, said populated liability class values, said populated net worth class values, said populated total periodic living expenses value, said populated total periodic income value, said determined total asset value, said determined total periodic cash flow value, said determined total liability value, said determined total net worth value, said calculated first cash flow value, said calculated second cash flow value and said stage within said worksheet concurrently, wherein said populated asset class values, said populated liability class values, said populated total periodic living expenses value, said populated total periodic income value, said calculated first cash flow value and said calculated second cash flow value are labeled during said displaying.

18. The system of claim 17, wherein said method further comprising:

receiving financial data based at least in part on a user selected demographic household segment, said populating based at least in part on said receiving, said financial data including at least one of said asset class values, said liability class values, said net worth class values and said periodic cash flow class values;

receiving a user modification of said received financial data as populated within said worksheet; and adjusting said financial life cycle stage based at least in part on said user modification.

19. The system of claim 17, wherein said method further comprising:

displaying a plurality of planned financial goal visual elements associated with a plurality of time periods and a plurality of actual financial performance visual elements associated with said time periods within said worksheet concurrently, said planned financial goal visual elements associated with said actual financial performance visual elements, at least one of said planned financial goal elements containing at least one of a plurality of financial goal values initially populated according to said second periodic cash flow value, said actual financial performance elements containing a plurality of user actual financial performance values, an achievement of said financial life cycle stage based at least in part on at least one of said actual performing values meeting at least one of said financial goal values during at least one of said time periods; and saving said worksheet in a database configured to provide an instance of subsequent user access after a user worksheet modification.

20. The system of claim 17, wherein said method further comprising:

populating said worksheet with financial data from at least one of a financial software application and a financial database accessible via a communication network, said financial data including at least one of said asset class values, said liability class values, said net worth values and said period cash flow values; and graphically depicting said financial life cycle stage, said depicting based on a movement through at least one of a debt accumulation stage, an asset accumulation stage, a debt reduction stage, a wealth accumulation stage, a partial financial independence stage and a complete financial independence stage.

* * * * *